United States Patent
Maruya

(10) Patent No.: US 6,902,686 B2
(45) Date of Patent: Jun. 7, 2005

(54) HYDROCARBON COMPOSITION, AND REFRIGERANT AND DETERGENT CONSISTING THEREOF

(75) Inventor: Richard Hiroshi Maruya, Saipan (MP)

(73) Assignee: A.S. Trust & Holdings Inc., Saipan ( * ) Notice: Subject to any disclaimer, the term of this patent is extended or adjusted under 35 U.S.C. 154(b) by 18 days.

(21) Appl. No.: 10/655,071

(22) Filed: Sep. 5, 2003

(65) Prior Publication Data

US 2005/0051756 A1 Mar. 10, 2005

(51) Int. Cl.$^7$ .............................. C11D 3/18; C09K 5/04
(52) U.S. Cl. ..................... 252/67; 510/213; 510/245
(58) Field of Search .............................. 252/67; 62/618, 62/619, 620, 625; 510/175, 184, 185, 213, 245

(56) References Cited

U.S. PATENT DOCUMENTS 4,511,381 A * 4/1985 Mehra .................. 62/625
6,336,333 B1   1/2002 Lindgren

FOREIGN PATENT DOCUMENTS

| | | |
|---|---|---|
| JP | 54-6881 | 1/1979 |
| JP | 54-6882 | 1/1979 |
| JP | 1-139676 | 6/1989 |
| JP | 1-139677 | 6/1989 |
| JP | 8-176536 | 7/1996 |

* cited by examiner

Primary Examiner—John R. Hardee
(74) Attorney, Agent, or Firm—Wenderoth, Lind & Ponack, L.L.P.

(57) ABSTRACT

A hydrocarbon composition prepared by combining methane, ethane, isopentane, normal pentane, hexane and heptane at an appropriate compounding ratio contains 75% or more by volume of propane, isobutane and normal butane, to have ignition temperature of 800° C. and above. This composition is safe and economical in using as a refrigerant for use in air conditioners and refrigerators or a detergent for cleansing precision components such as semiconductor chips. The composition can be used independently without being combined with a conventional refrigerant such as CFC and HFC and does not destroy ozone, thus to contribute to the protection of the environment.

6 Claims, No Drawings

HYDROCARBON COMPOSITION, AND REFRIGERANT AND DETERGENT CONSISTING THEREOF

BACKGROUND OF THE INVENTION

1. Field of the Invention

This invention relates to a hydrocarbon composition capable of being suitably used as a refrigerant for use in air conditioners and refrigerators or a detergent for cleansing precision components such as semiconductor chips and mother boards in computers and parts in hard disk drives or other precision instruments.

2. Description of the Related Art

The so-called chlorofluorocarbons (CFC) such as dichlorodifluoromethane and monochlorodifluoromethane were in heavy usage as a refrigerant for use in air conditioners and refrigerators or a detergent for cleansing or washing precision components. It has been pointed out that CFCs have the advantage of safe incombustibility, high stability, and lower toxicity, whereas CFC destroys the ozone layer, consequently to exert a serious influence upon the global environment. Thus, the production and use of CFC have been gradually reduced and now tend to be abolished totally.

Accordingly, there have been developed a variety of alternatives for chlorofluorocarbon. As typical of the alternatives for chlorofluorocarbon, the so-called HFC such as 1,1,1,2-tetrafluoroethane and 1,1,1-trifloroethane has been known. HFC does not degrade the ozone layer so much, but it has an adverse environmental effect to cause global warming, thus leaving room for improvement in HFC.

Under the circumstances, intense interest has lately been shown toward hydrocarbon compositions as one of alternatives for chlorofluorocarbon (hydrochlorofluorocarbons). The hydrocarbon compositions advantageously have low ability to destroy ozone and cause global warming.

For instance, Japanese Patent Application Public Disclosure No. HEI 01-139676(A) discloses working medium composites containing, as essential components, at least one selected from the group consisting of hydrocarbons having a carbon number of 4–5, monochlorodifluoromethane and monochloropentafluoroethane. As the hydrocarbons having a carbon number of 4–5, there are disclosed n-butane, isobutane, cyclobutane, n-pentane, isopentane, and cyclopentane. Other hydrocarbon compositions are disclosed in Japanese Patent Application Public Disclosures Nos. SHO 54-6881(A), SHO 54-6882(A), and HEI 01-139677(A).

Japanese Patent Application Public Disclosure No. HEI 08-176536(A) discloses a refrigerant consisting of a saturated hydrocarbon containing an unsaturated hydrocarbon. This further discloses a preferable refrigerant made by mixing a first refrigerant component consisting of a saturated hydrocarbon containing an unsaturated hydrocarbon, a second refrigerant component consisting of at least one of a hydrogenated fluorocarbon refrigerant and a carbon fluoride refrigerant, which have higher boiling points than that of the first refrigerant component, and a third refrigerant consisting of a saturated hydrocarbon having a higher boiling point than that of the second refrigerant component. In this conventional art, propane and butane may be used as the aforementioned saturated hydrocarbon by way of example.

Also, U.S. Pat. No. 6,336,333 discloses a refrigerant mixture of propane and butane.

The conventional hydrocarbon compositions described above are generally used in the state combined with CFC, HFC or the like and therefore, these are undesirable from the standpoint of the protection of the environment. Thus, a need has been felt for hydrocarbon compositions capable of being independently used as a refrigerant.

To be more specific, the aforementioned refrigerant consisting of propane and butane has the following problem. That is, the refrigerant consisting of propane and butane is apt to be decomposed to these components when leaking outside a cooling system or other apparatuses. As a result, the refrigerant left in the cooling system possibly breaks down the balance of its essential compositions, and consequently, it needs to be replaced entirely with a new refrigerant when being renewed, resultingly to shorten the life of the system.

Moreover, the aforementioned refrigerant consisting of propane and butane has a low ignition temperature in the order of 400° C. due to weak intermolecular binding power of the components thereof and has a problem from the viewpoint of safety. Thus, there has been a great need for a safe, superior hydrocarbon composition having higher ignition temperature.

OBJECT OF THE INVENTION

It is an object of the present invention is to provide a hydrocarbon composition capable of being suitably and used alone as a refrigerant and a detergent without being combined with CFC and HFC.

Another object of the present invention is to provide a novel hydrocarbon composition consisting of indissociable components so as not to break down the balance of the essential components thereof even if the composition leaks outside a system such as a cooling or cleansing equipment, thereby to extend the life of the system.

Still another object of the present invention is to provide a safe hydrocarbon composition having high ignition temperature.

SUMMARY OF THE INVENTION

To attain the objects described above according to the present invention, there is provided a hydrocarbon composition consisting of ethane, propane, isobutane, normal butane, isopentane, and normal pentane. The hydrocarbon composition of the invention may further contain hexane in addition to the aforementioned constituent components. In addition to the components described, there may be contained methane and heptane.

The propane, isobutane and normal butane are 75% or more by volume of all the constituent components of the composition, so that the hydrocarbon composition has ignition temperature of 800° C. and above.

The hydrocarbon composition of the invention can be used as a refrigerant or detergent.

The components of the aforementioned hydrocarbon composition are hard to separate from one another by the mutual interaction among the respective components to have properties as if they behave like a single constituent as a whole. Consequently, even if the hydrocarbon composition leaks outside a system such as a cooling or cleansing equipment, the balance of the essential components thereof can be maintained. Besides, the ignition temperature of the composition is advantageously increased to 800° C. and above. The hexane and heptane in the composition may include various types of isomers.

The detergent according to the hydrocarbon composition of the invention has an excellent cleansing property capable of washing various equipment or machine parts, such as semiconductor chips for use in computers, and evaporating in a short period of time.

The above mentioned and other features and objects of this invention and the manner of obtaining them will become more apparent and the invention itself will be better understood by reference to the following description of embodiments of the invention.

DESCRIPTION OF THE PREFERRED EMBODIMENTS OF THE INVENTION

The preferred embodiment of the hydrocarbon composition according to the present invention will be explained hereinafter in detail.

The hydrocarbon composition of the invention generally contains at least ethane, propane, isobutane, normal butane, isopentane, and normal pentane in combination. The inventor has found out that the hydrocarbon composition prepared by appropriately combining these components behave like a single constituent as a whole and can hardly decompose to the components. Thus, the ignition temperature of the composition can be increased.

The hydrocarbon composition of the invention may further contain hexane in addition to the constituent components described above. The hexane added thereto has a function of further strengthening the mutual interaction among the respective components of the hydrocarbon composition, consequently to make it hard to decompose the composition to the respective constituent components.

Since the evaporativity of the hydrocarbon composition of the invention can suitably be controlled, it is advantageous to use the hydrocarbon composition as a detergent. Besides, the hydrocarbon composition of the invention has an excellent detergency amply sufficient to cleansing various equipments or machine parts such as semiconductor chips for use in computers.

As the hexane, there may be used various types of isomers, such as n-hexane, 2-methylpetane, 3-methylpetane, 2,2-dimethyle butane, and 2,3-dimethyle butane.

In addition to the hydrocarbon composition consisting of the aforementioned components, there may be contained methane and heptane. The mixing of methane and heptane brings about an effect of strengthening the intermolecular binding power of the components and increasing the ignition temperature to 800° C. and above. In comparison with the conventional hydrocarbon composition with ignition temperature of 400° C. at the highest, the hydrocarbon composition with ignition temperature of 800° C. and above is extremely safe for use even near the fire.

As the heptane, there may be used various types of isomers, such as n-heptane, 2-methylhexane, 3-methylhexane, 2,3-dimethylpentane, 2,4-dimethylpentane and ethylpentane.

Table 1 below shows the ignition temperature of each of the components of the aforementioned hydrocarbon composition.

TABLE 1

| | Molecular Weight | Flash Point ° C. | Ignition Temperature ° C. |
| --- | --- | --- | --- |
| Methane | 16.0 | — | 537 |
| Ethane | 30.1 | — | 510 |
| Propane | 44.1 | — | 467 |

TABLE 1-continued

| | Molecular Weight | Flash Point ° C. | Ignition Temperature ° C. |
| --- | --- | --- | --- |
| Butane | 58.1 | −60 | 430 |
| Pentane | 72.1 | <−40 | 309 |
| Hexane | 86.1 | −26 | 260 |
| Heptane | 100.1 | −4 | 233 |

According to the data in Table 1 above, the ignition temperatures of the respective components of the hydrocarbon composition are in the range of 233 to 537° C. That is, the high ignition temperature of the hydrocarbon composition of the invention, which is 800° C. and above, cannot be effected only by simply combining or adding the components, but can be brought about as a peculiar attribute through the mutual interaction among the components combined at a prescribed ratio.

The compounding ratio of the components of the hydrocarbon composition can be arbitrarily determined according to need and should not be understood as being limited specifically. As one example, it is desirable that the total amount of propane, isobutane and normal butane is determined to 75% or more, preferably 90% or more, by volume in the liquid state of all the constituent components of the composition. In a case where the total amount of those components is less than 75% by volume, the ignition temperature of 800° C. and above cannot be fulfilled, and there is a tendency to decrease the boiling temperature of the composition by several 10% and increase the melting temperature of the same by several 10%. As a result, the composition in which the total amount of those components is less than 75% by volume is inefficient in refrigerating, and thus, inadequate to be used as a refrigerant.

The hydrocarbon composition containing the components at the appropriate compounding ratio as described above according to the invention can be suitably used as the refrigerant. To be more specific, the hydrocarbon composition of the invention can be filled as the refrigerant in a cooling system along with refrigerant oil, lubricating oil and an odor eliminating agent as occasion arises. Even where the hydrocarbon composition of the invention is used as the refrigerant, it can be used independently without being combined with a conventional refrigerant such as chlorofluorocarbon. The cooling system to which the hydrocarbon composition of the invention is applied is by no means limited to any specific devices or equipments and may be used alone. More specifically, the hydrocarbon composition of the invention is applicable to the cooling systems such as air conditioners for household use, dehumidifier systems, air conditioners for use in an automobile, railroad vehicles, civil aircrafts and air carriers, refrigerators, freezers, and beverage vending machines.

Since the hydrocarbon composition of the invention has high molecular weight, it does not leak from the cooling system through a joint or an O-ring, nor does it corrode materials such as aluminum even when used as a refrigerant. Furthermore, even if the hydrocarbon composition leaks outside an applicable system, it will leak as one body without decomposing to its constituent components, thus to allow the balance of constituent components to remain unchanged. Therefore, where the hydrocarbon composition leaks, the quantity of leaked composition may be supplied collaterally. Thus, it is clear from the foregoing that the hydrocarbon composition of the invention is highly safe and economical. Besides, the hydrocarbon composition of the invention has good chemistry in solubility with refrigerant oil or lubricating oil, consequently to effectively flush out the oil in a system to which the hydrocarbon composition of the invention is applied. As a result, the inside of the system through which the hydrocarbon composition circulates can be kept clean without permitting the oil to stay in one location, thus to enhance an cooling effect to the fullest extent.

The hydrocarbon composition of the invention can be used suitably as a detergent for cleansing various mechanical and electronic parts. The detergent according to the hydrocarbon composition of the invention advantageously has a quick-drying effect and excellent deterging effect owing to its high mutual interaction among the constituent components. In particular, the detergent of the invention can be used for cleansing precision components such as semiconductor chips and mother boards in corners and parts in hard disk drives or other precision instruments.

In fact, the hydrocarbon composition of the invention can be used as not only a refrigerant and detergent as described, but also a foaming agent, propellant and adhesive agent.

[PRACTICAL EXAMPLE]

One embodiment of the present invention will be described hereinbelow, but this should not be understood as being limited thereto.

(EXAMPLE 1)

An objective hydrocarbon composition was prepared by combining the constituent components, i.e. methane, ethane, propane, isobutane, normal butane, isopentane, normal pentane, hexane and heptane. The mixture ratios of the constituent components of the composition are shown in Table 2. The total amount of propane, isobutane and normal butane was 96.7% by volume of all the constituent components of the composition.

TABLE 2

|  | Mixture Ratio | | |
| --- | --- | --- | --- |
|  | mol % | wt % | Liq. vol. % |
| Methane | 0.0057 | 0.0017 | 0.0030 |
| Ethane | 0.0248 | 0.0151 | 0.0226 |
| Propane | 0.5621 | 0.5009 | 0.5288 |
| Isobutane | 0.1267 | 0.1489 | 0.1415 |
| Normal Butane | 0.2754 | 0.3236 | 0.2964 |
| Isopentane | 0.0017 | 0.0025 | 0.0021 |
| Normal Pentane | 0.0011 | 0.0016 | 0.0014 |
| Hexane | 0.0011 | 0.0019 | 0.0015 |
| Heptane | 0.0019 | 0.0038 | 0.0027 |
| Total | 1.0000 | 1.0000 | 1.0000 |

It turned out that the ignition temperature of the hydrocarbon composition thus prepared was 886° C. When the hydrocarbon composition was used as a detergent, it evaporated 11 seconds after being applied to an object to be cleansed. Consequently, a favorable result of cleansing the object 99.44% as compared with the first could be obtained. Other measured values are shown in Table 3 along with the measured data of ammonia, hydrochlorofluorocarbon (HCFC) such as R22 and hydrofluorocarbon (HFC) such as R134a, which were used experimentally as comparative materials.

TABLE 3

|  | Ammonia | R22 | R134a | Composition of Invention |
| --- | --- | --- | --- | --- |
| Chemical Formula | $NH_3$ | $CHClF_2$ | $CH_2F-FC_3$ |  |
| Molecular Weight | 17.03 | 86.469 | 102.031 | 49.47 |
| Boiling Point (° C.) | −33.326 | −40.81 | −28.1 | −28 |
| Melting Point (° C.) | −77.74 | −160 | −101 | −187.7 |
| Critical Temp. (° C.) | 132.25 | 96.125 | 101.15 | 115 |
| Critical Pressure MPa | 11.361 | 4.988 | 4.065 | 4.06 |
| Critical Density Kg/L | 0.2245 | 0.513 | 0.511 | 0.2246 PS 0.2049 True |
| Density of Saturated Solution (30° C.) | 0.59518 | 1.1708 | 1.206 (25° C.) | 0.5107 |
| Vaporization Heat (101.325 KPa) kJ/kg | 1369.5 | 233.22 | 216.4 | 345.6 |
| Surface Tension (30° C.) (mNm) | 19.4 | 6.8 | 7.31 | 7.117 |
| Viscosity Coefficient (Saturated Solution, 30° C.) | 0.129 | 0.171 | 0.2019 (25° C.) | 0.1105 |

It is found from Table 3 that the hydrocarbon composition according to the invention with higher boiling temperature and vaporization heat has high refrigeration efficiency, and therefore, it is suitable for refrigeration as a refrigerant.

(EXAMPLE 2)

An objective hydrocarbon composition was prepared by combining the constituent components, i.e. methane, ethane, propane, isobutane, normal butane, isopentane, normal pentane, hexane and heptane. The mixture ratios of the constituent components of the composition in Example 2 are shown in Table 4. The total amount of propane, isobutane and normal butane was 78.2% by volume of all the constituent components of the composition.

TABLE 4

|  | Mixture Ratio | | |
| --- | --- | --- | --- |
|  | mol % | wt % | Liq. vol. % |
| Methane | 0.0292 | 0.0100 | 0.0207 |
| Ethane | 0.1714 | 0.1101 | 0.1537 |
| Propane | 0.4444 | 0.4186 | 0.4230 |
| Isobutane | 0.1001 | 0.1242 | 0.1132 |
| Normal Butane | 0.2175 | 0.2701 | 0.2371 |
| Isopentane | 0.0113 | 0.0174 | 0.0143 |
| Normal Pentane | 0.0076 | 0.0117 | 0.0095 |
| Hexane | 0.0072 | 0.0132 | 0.0102 |
| Heptane | 0.0115 | 0.0247 | 0.0187 |
| Total | 1.0000 | 1.0000 | 1.0000 |

It turned out that the ignition temperature of the hydrocarbon composition thus prepared was 821° C. Thus, the hydrocarbon composition of the invention is highly safe and can suitably used as a refrigerant or detergent.

(COMPARATIVE EXAMPLE 1)

A comparative hydrocarbon composition was prepared by combining methane, ethane, propane, isobutane, normal butane, isopentane, normal pentane, hexane and heptane. The mixture ratios of the constituent components of the comparative composition are shown in Table 5. The total amount of propane, isobutane and normal butane was 67.7% by volume of all the constituent components of the comparative composition. The total amount is out of the range prescribed in the preset invention.

TABLE 5

| | Mixture Ratio | | |
|---|---|---|---|
| | mol % | wt % | Liq. vol. % |
| Methane | 0.0463 | 0.0162 | 0.0303 |
| Ethane | 0.2284 | 0.1498 | 0.2055 |
| Propane | 0.2877 | 0.3727 | 0.3702 |
| Isobutane | 0.0873 | 0.1107 | 0.0991 |
| Normal Butane | 0.1897 | 0.2405 | 0.2075 |
| Isopentane | 0.0182 | 0.0286 | 0.9231 |
| Normal Pentane | 0.0123 | 0.0193 | 0.0154 |
| Hexane | 0.0116 | 0.0217 | 0.0165 |
| Heptane | 0.0185 | 0.0405 | 0.0297 |
| Total | 1.0000 | 1.0000 | 1.0000 |

The ignition temperature of the hydrocarbon composition prepared in the comparative example was 472° C., which is as much as that of a conventional hydrocarbon refrigerant.

As is apparent from the foregoing description, the hydrocarbon composition according to the present invention can suitably be used as a refrigerant and detergent, and besides, it can be used independently without being combined with a conventional refrigerant such as CFC and HFC. In addition, the hydrocarbon composition of the invention does not destroy ozone, thus to contribute to the protection of the environment.

Furthermore, even if the hydrocarbon composition of the invention leaks outside an applicable system, it leaks as one body without decomposing to its constituent components, thus to allow the balance of constituent components to remain unchanged. Therefore, where the hydrocarbon composition leaks, the quantity of leaked composition may be supplied collaterally. Therefore, the hydrocarbon composition of the invention is highly safe and economical. Moreover, the hydrocarbon composition of the invention has good chemistry in solubility with refrigerant oil or lubricating oil, consequently to effectively flush out the oil in a system to which the hydrocarbon composition of the invention is applied. As a result, the inside of the system through which the hydrocarbon composition circulates can be kept clean without permitting the oil to stay in one location, thus to enhance an cooling effect to the fullest extent.

The hydrocarbon composition of the invention can be used suitably as a detergent for cleansing various mechanical and electronic parts. The detergent according to the hydrocarbon composition of the invention advantageously has a quick effect and excellent deterging effect owing to its high mutual interaction among the constituent components. In particular, the detergent of the invention can be used for cleansing precision components such as semiconductor chips and mother boards in computers and parts in hard disk drives or other precision instruments.

As such, an invention has been disclosed in terms of a preferred embodiment thereof which fulfills each and every one of the objects of the invention as set forth above and provides a new and useful hydrocarbon composition of great novelty and utility. Of course, various changes, modifications and alterations in the teachings of the present invention may be contemplated by those skilled in the art without departing from the intended spirit and scope thereof. As such, it is intended that the present invention only be limited by the terms of the appended claims.

What is claimed is:

1. A hydrocarbon composition comprising ethane, propane, isobutane, normal butane, isopentane, and normal pentane, wherein said propane, isobutane and normal butane are 75% or more by volume of the composition, and wherein the composition has an ignition temperature of 800° C. or above.

2. The hydrocarbon composition as set forth in claim 1, which further comprises at least one member selected from the group consisting of methane, hexane and heptane.

3. A refrigerant comprising the hydrocarbon composition of claim 2.

4. A detergent comprising the hydrocarbon composition of claim 2.

5. A refrigerant comprising the hydrocarbon composition of claim 1.

6. A detergent comprising the hydrocarbon composition of claim 1.

* * * * *